United States Patent [19]

De Luca et al.

[11] 4,321,650

[45] Mar. 23, 1982

[54] TELEPHONE CIRCUIT SENSITIVE STATION PROTECTOR

[75] Inventors: Paul V. De Luca, Plandome Manor; Michael Fasano, Syosset, both of N.Y.

[73] Assignee: Porta Systems Corp., Syosset, N.Y.

[21] Appl. No.: 151,151

[22] Filed: May 19, 1980

[51] Int. Cl.$^{3}$ .......................... H02H 3/22; H02H 9/04

[52] U.S. Cl. .................................... 361/119; 361/124; 337/33

[58] Field of Search ................. 361/119, 124, 118, 56, 361/117, 125; 337/32, 33, 31, 34, 15, 28; 313/325, 231.1

[56] References Cited

U.S. PATENT DOCUMENTS 3,703,665 11/1972 Yereance et al. .................. 361/126
3,825,867 7/1974 Georgopulos ................. 361/124 X
3,947,730 3/1976 De Luca et al. .................... 361/124

*Primary Examiner*—Patrick R. Salce
*Attorney, Agent, or Firm*—Charles E. Temko

[57] ABSTRACT

A protective module of the type used in building entrance terminals having substantially greater heat sensitivity than prior art types, thereby offering protection against sneak currents which are not sufficiently large to activate conventional solder pellet heat sensors. Use is made of a bobbin type heat sensor, the thermal inertia value of which may be varied to alter sensitivity.

2 Claims, 5 Drawing Figures

TELEPHONE CIRCUIT SENSITIVE STATION PROTECTOR

BACKGROUND OF THE INVENTION

This invention relates generally to the field of telephony, and more particularly to an improved overvoltage arrestor of a type used in conjunction with a building entrance terminal to provide protection to subscriber equipment. Devices of this general type are known in the art, and the invention lies in specific constructional details which permit the device to offer an improved degree of protection.

A typical protective arrestor of this type is illustrated in the U.S. Pat. No. 3,703,665, to Yearance et al. granted Nov. 21, 1972. The disclosed protector includes an elongated threaded housing, the outer portion of which is provided two engaging means to facilitate threaded engagement with a corresponding socket in the station protector terminal. A coil spring within the housing urges a cage-like retaining member outwardly of the housing and into contact with a grounded contact on the station protector terminal. In that type of similar module employing heat sensitive means, a solder pellet is provided within the cage which melts under heat and flows through an opening in one of the carbon electrodes to reach the other electrode and effectively short the arcing gap by providing another path to a source of ground potential.

As indicated in the Yearance patent, the problem of electrode erosion with continued use is a long standing problem. It is known to configure the opposed arcing surfaces of the electrodes which are made of carbon to improve the life span thereof. Unfortunately, the erosion ultimately becomes great enough that the gap between the electrodes is excessive, and arcing no longer occurs at the previously predetermined breakdown voltage.

It has been previously considered that the great bulk of carbon erosion takes place during surges of substantial excessive current. What has not been appreciated is that relatively small surges also cause erosion, and are much more common. It has been determined, for example, that sneak currents in the order of 100 milliamps continued for a period of two minutes is sufficient to enlarge the gap between the electrodes to a point where normal breakdown voltages no longer conduct. Such current, however, for the abovementioned period, is not sufficient to melt the conventional solder pellet. Thereafter, when a more powerful current surge occurs, the device, if not previously replaced, does not function, and the excessive current surge is transmitted to the subscriber equipment with the distinct possibility of damage to such equipment. If the equipment should be in use at the time of the surge, the possibility of injury to the user is also present.

Consistent with this recently discovered danger, Underwriters Laboratories, has prescribed new standards wherein protection modules of this type are to fire upon the occurrence of the equivalent of 100 milliampere surge for a period of two minutes.

SUMMARY OF THE INVENTION

Briefly stated, the invention contemplates the provision of an improved building terminal type protective module having heat sensitive means of substantially greater sensitivity than that of the conventional solder pellet type. In lieu of the pellet, the metallic cage which encloses the carbon electrode assembly is provided with an inner cap-like housing which projects outwardly into the convolutions of the coil spring. In the space provided by the cap-like housing, a cylindrical metallic bushing of relatively low thermal inertia supports an elongated conductive pin secured within a bore in the bushing by a thin film of solder, and projecting through an opening in one of the carbon electrodes. The prior art coil spring within the outer housing serves the purpose of urging the case against a grounded terminal.

BRIEF DESCRIPTION OF THE DRAWING

In the drawing, to which reference will be made in the specification, similar reference characters have been employed to designate corresponding parts throughout the several views.

DETAILED DESCRIPTION OF THE DISCLOSED EMBODIMENT

Figure 1:
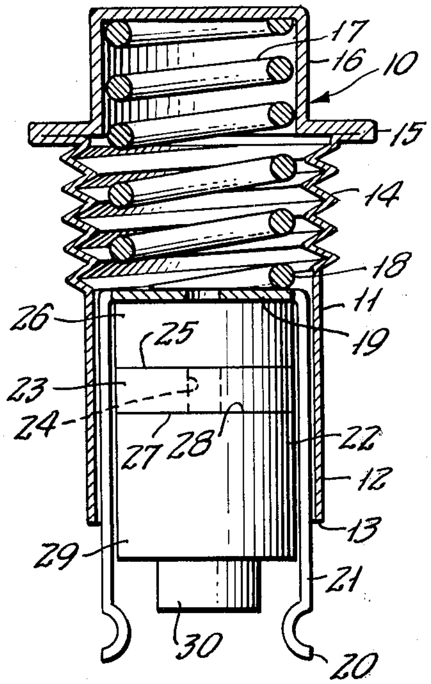
FIG. 1. PRIOR ART
FIG. 1 is a longitudinal sectional view of a prior art device shown for comparative purposes.

Before entering into a description of the present embodiment, a review of the prior art is considered apposite. A prior art device, generally indicated by reference character 10 is illustrated in FIG. 1 in the drawing, the device having an outer housing 11 including an inner cylindrical wall 12 terminating in an opening 13. A threaded area 14 abuts a radially extending flange 15, on the opposite side of which an outer end 16 may be configured to accept a tool for installing the device in a threaded socket. Disposed within the outer end 16 is a compressable coil spring 17, an inner end 18 of which engages an end wall 19 of a cage element 20 having a plurality of spring fingers 21 which support a carbon electrode element 22. The element 22 includes a planar disk carbon 23 having a centrally disposed opening 24. An outer surface 25 engages a solder pellet 26, while an inner surface 27 engages an end surface 28 of a ceramic sleeve 29 which mounts a cylindrical carbon 30 such that the inner surface thereof (not shown) is in spaced relation relative to the surface 28.

During operation of the device 10, upon the occurrence of a continuous excessive current surge, the solder pellet 26 will melt and flow through the opening 24 to allow the cage to move downwardly to short the spring fingers 21 against a grounded contact (not shown). Depending upon the amount of current involved, this melting operation may require a considerable period of time, often in excess of two minutes. During this time, the current surge arcs across the electrode gap, the surfaces of the electrodes being eroded during the process. Should the solder pellet not melt, the arcing distance is then substantially increased, such that arcing will not occur at a predetermined voltage, and thus, the device 10 no longer provides the protection for which it is intended.

Figure 2:
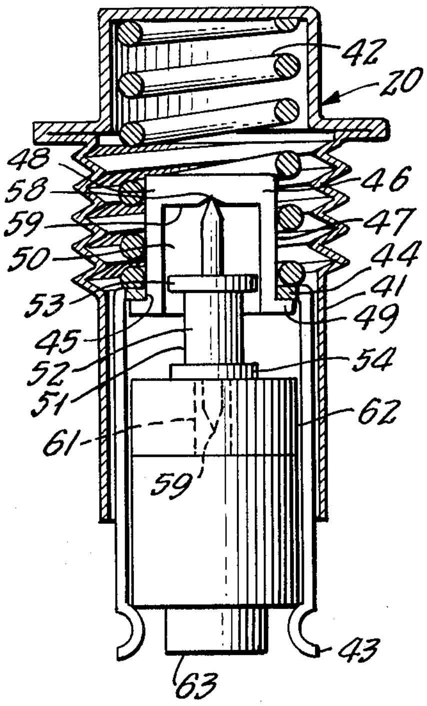
FIG. 2 is a corresponding sectional view of an embodiment of the invention.
Figure 3:
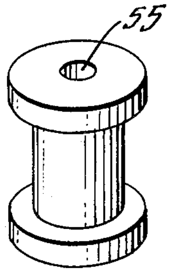
FIG. 3 is an enlarged view in perspective of a heat sensitive bushing forming a part of the disclosed embodiment.

With the foregoing in mind, reference may now be made to FIG. 2 in the drawing which discloses an embodiment of the invention. The device 20, as in the prior art, includes an outer housing 41 which encloses a coil spring 42 bearing upon a cage element 43. The end wall 44 of the cage element 43 is provided with a circular opening 45 in which a cap-like member 46 is engaged. The member 46 includes a cylindrical wall 47, an end wall 48 and a radially extending flange 49 which engages the inner surface of the end wall 44. The wall 47 forms a cylindrical recess 50 which extends into the convolutions of the spring 42, this recess enclosing a metallic fuse member 51. The member 51 includes a cylindrical body 52 and first and second end flanges 53 and 54. A hollow bore 55 (FIG. 3) engages conductive pin member 56 fixed within the bore by a thin film of solder (not shown). The outer end 58 of the pin engages an inner surface 59 of the end wall 48. The inner end of the pin 60 projects through the central bore 61 of the disk electrode 62.

During the occurrence of an excessive current surge causing arcing, the heat generated by the arcing is transmitted through the disk electrode 62 directly to the member 51, which, being of relatively little mass, has a low thermal inertia enabling the solder interconnection between the pin and the member 51 to be quickly melted. With proper adjustment of the mass of the member 51, this firing can occur with as small a current as 100 milliamps for a period of three minutes, or the equivalent.

Figure 4:
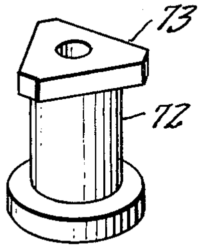
FIGS. 4 and 5 are corresponding perspective views of alternate forms of bushings.
Figure 5:
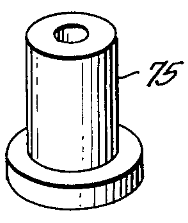

FIG. 4 illustrates an alternate form of member 51, designated by reference character 72, in which one of the end flanges 73 has been abbreviated to lessen the total mass. FIG. 5 illustrates at reference character 75 a still further abbreviation in which one of the end flanges is completely eliminated. The effect of such mutation is to allow firing under the influence of smaller currents and faster reaction time.

I wish it to be understood that I do not consider the invention limited to the precise details of structure shown and set forth in this specification, for obvious modifications will occur to those skilled in the art to which the invention pertains.

I claim:

1. In a telephone building entrance type overvoltage arrestor, including an outer generally tubular housing having an opening at one end thereof, a coil spring positioned within said housing, a cage slideably disposed within said housing and urged by said coil spring towards that opening, and an air gap carbon assembly disposed within said cage, including a disk carbon electrode and a cylindrical carbon electrode supported by a ceramic member, the improvement comprising: said cage having an end wall having a centrally disposed opening therein, a hollow cap-like member disposed within said opening and having a radially extending flange at an open end thereof overlying said opening in said end wall, whereby expansive force of said coil spring is transmitted thereto; a heat sensitive element disposed at least partially within said cap-like member and including a metallic bushing having a bore therein, and an electrically conductive pin fixed within said bore by a meltable material; said carbon disk electrode having a centrally disposed bore therein, said pin projecting through said bore; whereby upon the occurrence of excess current flow through said arrestor, and the occurrence of arcing caused thereby, heat developed by said arcing is conducted to said bushing to melt said meltable material and allow said cage to move outwardly of said housing to contact a grounded terminal.

2. The improvement set forth in claim 1, further characterized in said bushing having sufficiently low thermal inertia to allow said meltable material to melt upon the occurrence of a current flow equivalent to 100 milliamps for a period of two minutes.

* * * * *